April 28, 1931.  E. P. CRESSLER  1,802,405
INTERCHANGEABLE TEETH
Filed Oct. 19, 1927   2 Sheets-Sheet 1

Inventor
Edward P. Cressler
By Rogers Kennedy Campbell
Attorney

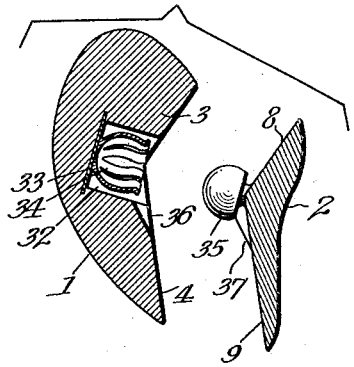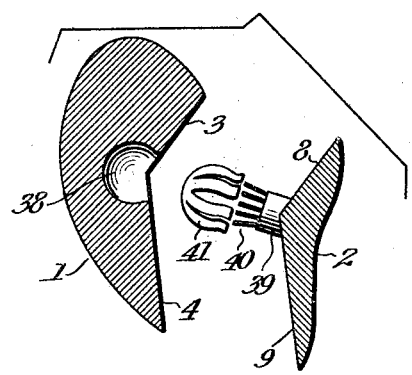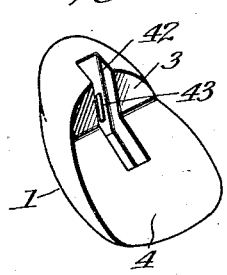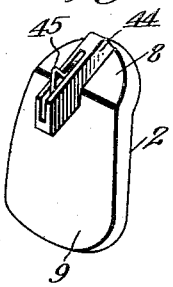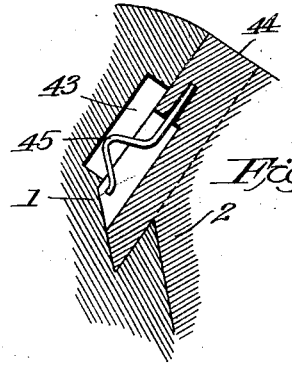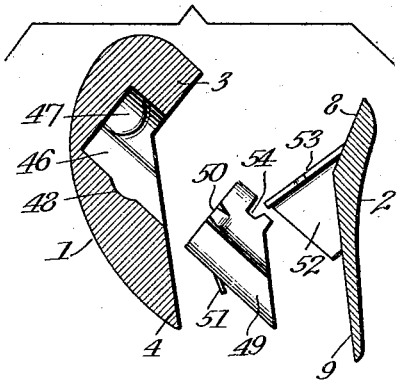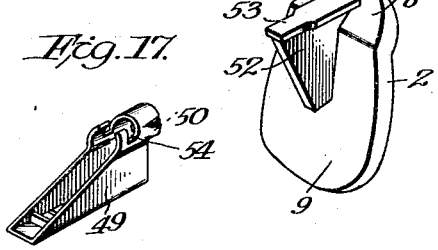

Patented Apr. 28, 1931

1,802,405

UNITED STATES PATENT OFFICE

EDWARD P. CRESSLER, OF NEWTON, KANSAS

INTERCHANGEABLE TEETH

Application filed October 19, 1927. Serial No. 227,273.

This invention relates to improvements in interchangeable teeth and contemplates the provision of novel means for securely retaining a tooth-facing and backing in assembled relation.

In securing a tooth-facing to a backing it is desirable to provide means that will positively lock them together in addition to the cement commonly used. A spring fastener of the snap fastener type is ideal for this purpose, but in fitting the tooth to the backing and removing it therefrom, as is generally necessary before the final installation, the spring fastener might lose its tension or the tooth might break, resulting in waste of time and material. It is therefore of great practical advantage to provide the spring fastener with adjustable means for varying the tension of the spring so that during the fitting, the fastener may seat loosely in its socket, and then, just before final installation, the spring may be tightened so that the tooth will snap into place.

It is therefore an object of the invention to provide spring means for securing a tooth-facing to a backing, which means is adjustable to increase the tension of the spring to positively lock the tooth to the backing.

It is a further object of the invention to provide spring means for securing a tooth-facing to a backing, which means seats loosely in one of the members during the fitting but which may be tightened just prior to the permanent installation so that the members may be snapped together.

Other objects and advantages will in part be obvious and in part more fully brought out as the description proceeds.

In the accompanying drawings I have illustrated a number of embodiments of my invention, but it is to be understood that the drawings are illustrative, merely, and that my invention is not confined to the details of construction therein shown. Other modifications may be made by those skilled in the art without departing from the spirit and scope of my invention as defined in the appended claims.

In these drawings:

Fig. 11 is a collective view in section of another modified form of tooth-facing and backing;

Fig. 12 is a collective view in section of still another modification, showing the tooth-facing, backing, and fastening means dissociated;

Fig. 13 is a perspective view of another modified form of tooth-facing;

Fig. 14 is a perspective view of a backing used with the tooth-facing illustrated in Fig. 13;

Fig. 15 is a fragmentary sectional view of the tooth-facing of Fig. 13 and backing of Fig. 14 in assembled relation;

Fig. 16 is a collective view in section showing another modified form of tooth-facing, backing and fastening means;

Fig. 17 is a perspective view of the fastening means illustrated in Fig. 16;

Fig. 18 is a perspective view of the backing illustrated in Fig. 16;

Figure 1:
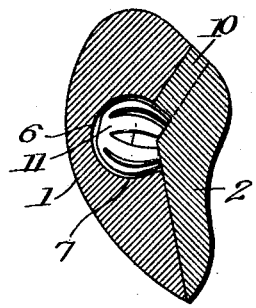
Figure 1 is a sectional view of a tooth-facing and backing in assembled relation, showing a spring fastener of my invention.
Figures 2, 3:
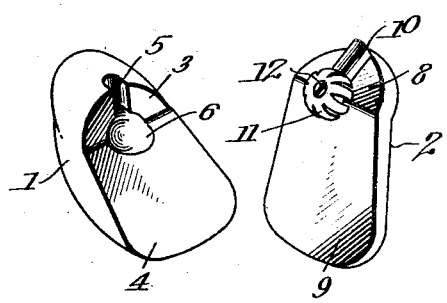
Fig. 2 is a perspective view of the tooth-facing illustrated in Figure 1.
Fig. 3 is a perspective view of the backing illustrated in Figure 1.

Referring now to Figs. 1, 2, and 3 the reference numeral 1 indicates a tooth-facing and the numeral 2, a backing. The lingual surface of the tooth comprises two angularly related walls 3 and 4. The wall 3 is provided with a slot 5 extending, at the top, into the pontic or root portion of the tooth and, at the bottom, merging into an annular opening 6 which is located on the vertex of the angle between the walls 3 and 4 with a portion of the opening in each wall. The opening 6 is undercut as indicated at 7. It will be noted from an inspection of Fig. 2 that the slot 5 and opening 6 constitute what is generally known as a keyhole slot or recess.

The backing 2 comprises two angularly related walls 8 and 9, forming the same angle as the walls 3 and 4 of the tooth-facing. The wall 8 of the backing is provided with a projection 10 adapted to seat in the slot 5 of the tooth-facing. On the meeting line of the walls 8 and 9 is mounted a spring fastener 11 provided with an adjusting screw 12 by which the tension of the fastener will be varied.

Figure 4:
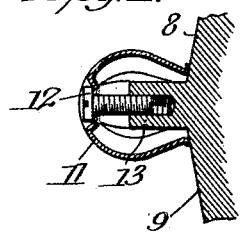
Fig. 4 is an enlarged view, partly in section, of the spring fastener illustrated in Figure 1.

It will be noted from Fig. 4 that the screw 12 is threaded into a projection 13 on the backing. When the tooth-facing is being fitted in place, the spring fastener will be in the position shown in Fig. 4, with the spring fingers elongated in the direction of the axis of the screw. When the tooth is to be permanently installed, the screw 12 is turned into the projection 13, thus spreading or bulging the spring fingers, whereupon the tooth may be snapped into place on the backing. This spring fastener insures positive locking of the tooth and backing and adds materially to the permanency of the installation.

Figures 5, 6:
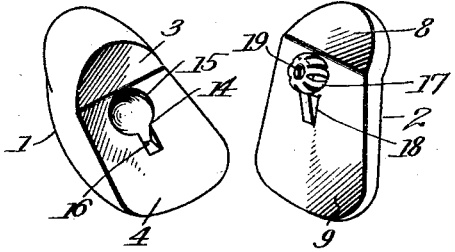
Fig. 5 is a perspective view of a modified form of tooth-facing.
Fig. 6 is a perspective view of a modified form of backing used with the tooth illustrated in Fig. 5.

In Figs. 5 and 6 I have illustrated a modification of the interlocking parts between the tooth-facing and backing. In this instance, the wall 4 of the lingual surface of the tooth is provided with a keyhole recess 14 comprising an undercut annular opening 15 merging into an elongated slot 16. The wall 9 of the backing is provided with a spring fastener 17 which will snap into the annular opening 15 of the keyhole recess and a projection 18 adapted to be received in the slot 16. In this form, also, the tension of the spring fastener may be adjusted by means of a screw 19.

Figures 7, 8:
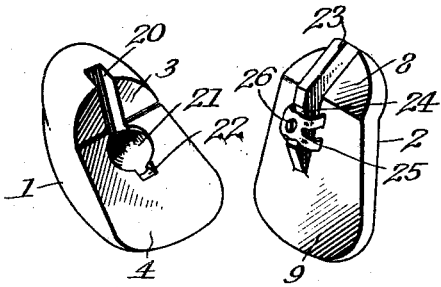
Fig. 7 is a perspective view of another modified form of tooth-facing.
Fig. 8 is a perspective view of a modified form of backing used with the tooth-facing illustrated in Fig. 7.

Figs. 7 and 8 illustrate another modification. The wall 3 of the tooth-facing is provided with a slot 20 extending, at the top, into the root portion of the tooth. The lower end of the slot 20 merges into an annular opening 21 which connects with another slot 22. The backing is provided with a projection 23 extending the length of the wall 8 and for a portion of the wall 9. This projection is provided with a cutout 24 in which is mounted a spring fastener 25, the spring fingers of which straddle the projection. When the tooth-facing is placed on the backing, the upper portion of the projection 23 enters the slot 20, the spring fastener snaps into the opening 21, and the lower portion of the projection enters the slot 22. As in the other fasteners heretofore described, the tension of the spring fastener 25 is adjusted by means of a screw 26.

Figures 9, 10:
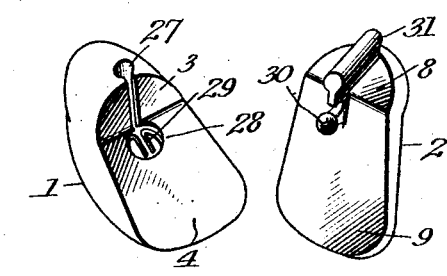
Fig. 9 is a perspective view of another modified form of tooth-facing.
Fig. 10 is a perspective view of a backing used in connection with the tooth-facing illustrated in Fig. 9.

A further modification is illustrated in Figs. 9 and 10. In this form, the tooth-facing is provided with a keyhole slot 27 extending into the top or root portion and also into the wall 3. The wall 4 is provided with an undercut annular opening 28 in which is housed a spring wire 29 fashioned to snap over a stud 30 on the wall 9 of the backing plate. The wall 8 of the backing is provided with a key projection 31 adapted to seat in the keyhole slot 27 of the tooth-facing. In this modification, the spring wire 29 is not inserted into the opening of the tooth until the final installation is to be made.

Still another modification is illustrated in Fig. 11. In this form, the tooth-facing is provided with an annular opening 32 in which is seated a plate 33 to which is soldered or otherwise secured a spring socket 34 adapted to receive a stud 35 on the backing. The tooth-facing also has a slot 36 to receive a projection 37 on the backing. In this form the spring socket may be distended during the fitting of the tooth and then, just prior to the final installation the spring fingers of the socket may be pinched together so that the stud 35 will snap into place.

Fig. 12 illustrates still another modification. In this form, the tooth-facing is provided with an annular opening 38 and the backing is provided with a projection 39 in which is bunched a plurality of fine wires 40. These wires are covered by and cemented to a spring fastener 41 which is adapted to snap into the opening 38.

In Figs. 13, 14 and 15 I have illustrated another modification. In this form the tooth is provided with a recess 42 extending into the root portion and also the walls 3 and 4 of the tooth. This slot is provided with a notch 43. The backing is provided with a projection 44 in which is secured a spring wire 45. When the tooth and backing are assembled, as illustrated in Fig. 15, the projection 44 seats in the recess 42 and the spring wire 45 snaps into the notch 43.

In Figs. 16, 17 and 18 another modification is illustrated. In this form, the tooth is provided with a keyhole recess 46 undercut as at 47 and 48. A locking pin 49 made of spring metal, is adapted to seat in the keyhole recess and is provided with spring tongues 50 and 51 engaging the undercut portions 47 and 48 respectively. The backing is provided with a projection 52 having a top portion 53 extending beyond the sides of the projection and this top portion engages a notch 54 in the locking pin. Just prior to the final installation the spring tongues are bent out so that they will snap into their respective seats.

Figure 19:
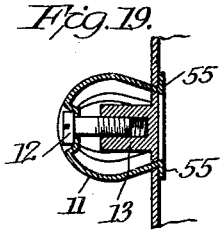
Fig. 19 is a view, in section, of a modified form of spring fastener.

In Figs. 19 to 22, inclusive, I have illustrated modifications of the spring fastener and adjusting means therefor. In Fig. 19, the ends of the spring fingers are passed through apertures in the backing and are bent over as at 55. The construction and operation is otherwise the same as the fastener illustrated in Fig. 4.

Figures 20, 21, 22:
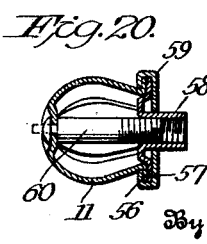
Fig. 20 is a sectional view of another modified form of spring fasteners.
Fig. 21 is a sectional view of still another modified form of fastener.
Fig. 22 is a plan view of the fastener illustrated in Fig. 21.

In Fig. 20 the spring fingers are bent outwardly as at 56 and interlocked with flanges 57 on a thimble 58 by means of clips 59. The thimble is internally threaded for the reception of an adjusting screw 60. It will be noted from the solid lines in this figure that the head-end of the screw is first passed through the spring fastener and then riveted in place as indicated in dotted lines.

In Figs. 21 and 22, the adjusting screw is provided with a ball head 61 by which the spring fingers of the fastener 62 may be spread apart to increase the tension of the fastener.

It is believed that my invention has now been fully brought out and that its many advantages have now become apparent. While the spring fastener and its tensioning means have herein been illustrated and described in connection with the mounting of a tooth facing on a backing, it will be obvious that the fastener may be used in a number of other relations. Where fasteners of this type are now in use, the spring very often loses its tension and it becomes a problem to restore the fastener to its original condition. It will be clear that by the provision of the tensioning means herein described, this problem is solved and that the tension of such a spring fastener may be adjusted at will.

I claim:

1. The combination of a tooth-facing, a backing therefor, spring means constituting a tension connection to secure the tooth-facing and the backing, and means to vary the tension of said spring means.

2. In combination, a tooth-facing, a backing, one provided with a socket, the other provided with a spring fastener adapted to form a tension connection with said socket to secure the tooth-facing and the backing, and means to vary the tension of the spring fastener.

3. In combination, a tooth-facing provided with a recess, a backing provided with a spring projection normally seating loosely in said recess, and means to expand the spring projection to cause it to fit tightly in the recess.

4. In combination, a tooth-facing, a backing, one provided with a recess and the other with a spring projection seating loosely in said recess, and means to expand the spring projection to cause it to fit tightly in said recess.

5. In combination, a tooth-facing provided with a recess, a backing plate provided with a projection normally seating loosely in said recess, tensioned spring means to lock said projection in said recess, and means to adjust the tension of the spring means.

6. In combination, a tooth-facing provided with a keyhole recess, a backing having a projection adapted to seat in the straight portion of said recess, a spring fastener on said backing adapted to constitute a tension connection with the round portion of said recess to secure the tooth-facing and the backing, and means to vary the tension of said spring fastener.

7. In combination, a tooth-facing provided with a recess, a backing provided with an internally threaded projection, a spring fastener mounted on said backing, and a screw passing through said fastener and threaded into said projection whereby the tension of the fastener may be adjusted.

8. In combination, a tooth-facing provided with a recess, a backing provided with an internally threaded projection, a spring fastener mounted on said backing and having portions passing through said backing, and a screw engaging said fastener and threaded into said projection whereby the spring fastener may be tensioned.

In testimony whereof, I have affixed my signature hereto.

EDWARD P. CRESSLER.